United States Patent [19]

Sasaki et al.

[11] Patent Number: 4,864,446
[45] Date of Patent: Sep. 5, 1989

[54] MECHANISM FOR GUIDING HEAD CARRIAGE

[75] Inventors: Hidemi Sasaki, Tokyo; Naoki Kobayashi, Ohmiya, both of Japan

[73] Assignee: Fuji Photo Film Co., Ltd., Japan

[21] Appl. No.: 273,638

[22] Filed: Nov. 18, 1988

Related U.S. Application Data

[63] Continuation of Ser. No. 903,405, Sep. 2, 1986, abandoned.

[30] Foreign Application Priority Data

Oct. 3, 1985 [JP] Japan .................. 60-219234

[51] Int. Cl.4 .............................................. G11B 8/55
[52] U.S. Cl. ................................................... 360/106
[58] Field of Search ................ 360/106, 105, 78, 109, 360/97.01, 99.01

[56] References Cited

U.S. PATENT DOCUMENTS

| | | | |
|---|---|---|---|
| 3,881,189 | 4/1975 | Mayeda | 360/106 |
| 3,922,718 | 11/1975 | Halfhill et al. | 360/106 |
| 4,198,666 | 4/1980 | Manzke et al. | 360/106 |
| 4,641,212 | 2/1987 | Yokota et al. | 360/106 |

FOREIGN PATENT DOCUMENTS 55-38697  3/1980  Japan .................. 360/106

OTHER PUBLICATIONS

Johnson, Jr. et al., "Small Modular/Linear Voice Coil Actuator", IBM Technical Disclosure Bulletin, vol. 21, No. 11, Apr. 1979, pp. 4632–4633.

Primary Examiner—John H. Wolff
Assistant Examiner—Matthew J. Bussan
Attorney, Agent, or Firm—Abelman Frayne Rezac & Schwab

[57] ABSTRACT

In a head carriage guiding mechanism for guiding a carriage carrying a magnetic head along a guide shaft thereby positioning the magnetic head in the radial direction of a magnetic sheet contained in a magnetic sheet pack, the guide shaft extends slidably through a chassis and is secured at one end thereof to the carriage so as to facilitate replacement of the carriage and improve the head positioning accuracy.

1 Claim, 7 Drawing Sheets

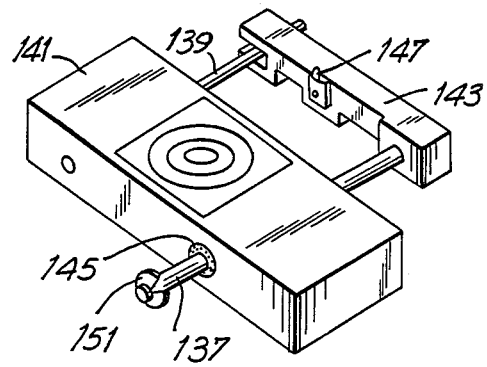
FIG. 10
FIG. 12
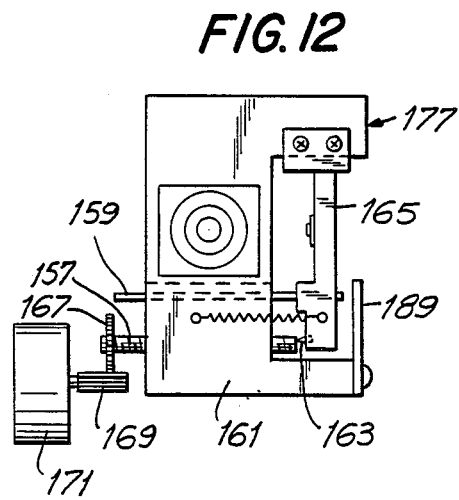
FIG. 11
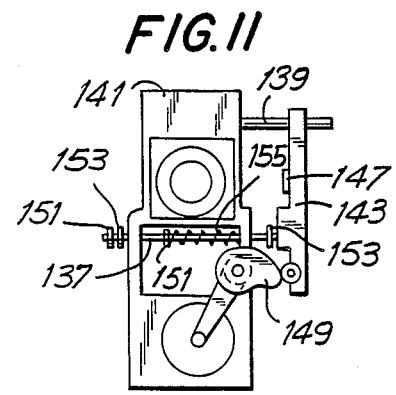
FIG. 13
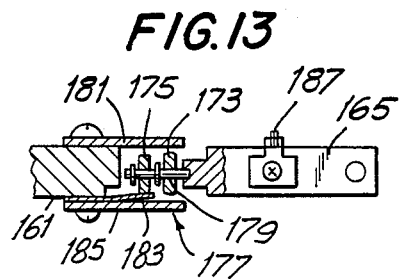
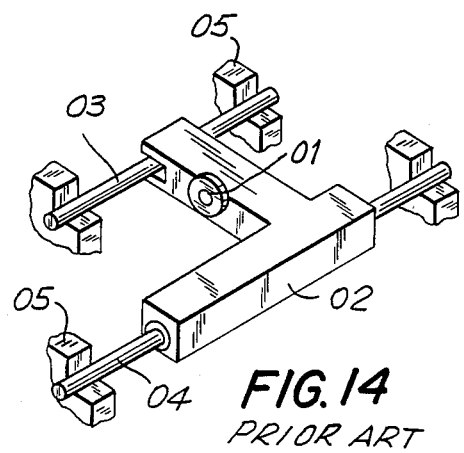
FIG. 14
PRIOR ART

MECHANISM FOR GUIDING HEAD CARRIAGE

This application is a continuation of application Ser. No. 903,405, filed Sept., 2, 1986 now abandoned.

BACKGROUND OF THE INVENTION

1. Field of the Invention

This invention relates to a mechanism for guiding a head carriage of a rotary magnetic sheet device in an electronic still camera system or the like, and more particularly to an improvement which facilitates replacement of the head carriage and can position a magnetic head with high accuracy.

2. Description of the Prior Art

An electronic still camera system is the combination of an image pickup device using a solid-state imaging element or a camera tube and a magnetic sheet device which is a recording and reproducing device using a magnetic sheet as a recording medium. In such a camera system, still pictures of subjects electronically photographed are recorded on a magnetic sheet, and the picture information recorded on the magnetic sheet are reproduced by a television, a printer or the like. The magnetic sheet used in the rotary magnetic sheet device in such an electronic still camera system is accommodated rotatably in a casing and is thus available in the form of a magnetic sheet pack which is commonly called a video floppy.

This magnetic sheet has a diameter of about 50 mm, and about 52 tracks are provided in the radial direction at an interval of about 100 μm. Because of such a high recording density, a magnetic head in the rotary magnetic sheet device must be positioned with very high accuracy in the radial direction of the magnetic sheet.

In view of such a severe requirement, a head carriage guiding mechanism as shown in FIG. 14 has been employed hitherto. In the prior art head carriage guiding mechanism shown in FIG. 14, a magnetic head 01 is carried by a carriage 02, and two guide shafts 03 and 04 slidably extending through the carriage 02 are fixed to a chassis 05. Therefore, by guiding the carriage 02 along the guide shafts 03 and 04, the magnetic head 01 is fed in the radial direction of a magnetic sheet.

In the prior art head carriage guiding mechanism shown in FIG. 14, the carriage 02 has a relatively large axial length at the portion where the guide shaft 04 extends therethrough. Because of the relatively large axial length of that portion of the carriage 02, not only the size and weight of the carriage 02 could not be reduced, but also a large burden has been imposed on a drive system driving the carriage 02. Further, since the guide shafts 03 and 04 are fixed to the chassis 05 through leaf springs fastened by screws, it has been inevitable that the magnetic head 01 tends to be dislocated depending on the magnitude of the tightening force imparted to the fastening screws. Also, the carriage 02 is to be replaced together with the magnetic head 01 due to excessive wear of the magnetic head 01, this replacement has been inconvenient in that the fastening screws must be loosened in order to take out the guide shafts 03 and 04.

SUMMARY OF THE INVENTION

With a view to obviate the prior art defects pointed out above, it is a primary object of the present invention to provide an improved head carriage guiding mechanism which facilitates replacement of the head carriage and can position the magnetic head with high accuracy.

In accordance with the present invention which attains the above object, there is provided a head carriage guiding mechanism comprising a carriage carrying a magnetic head and means for guiding the carriage along a guide shaft thereby positioning the magnetic head in the radial direction of a magnetic sheet, wherein the guide shaft extends slidably through a chassis and is secured at one end thereof to said carriage.

According to the head carriage guiding mechanism of the present invention, the guide shaft to which the carriage is secured can be make its sliding movement relative to the chassis. Therefore, in the case where replacement of the carriage is required, the carriage can be easily replaced together with the guide shaft by merely drawing out the guide shaft from the chassis. Further, since the guide shaft can be secured to the carriage with high accuracy, a magnetic head carried by a new carriage replacing the used carriage can be positioned with high accuracy without especially requiring adjustment.

BRIEF THE DRAWING

FIGS. 1 to 9 relate to an embodiment of the head carriage guiding mechanism according to the present invention, in which FIG. 1 is an exploded perspective view of principal parts of a rotary magnetic sheet device, FIG. 2 a schematic perspective view of an electronic camera and a magnetic sheet pack, FIG. 3 is a perspective view of the rotary magnetic sheet device shown together with the magnetic sheet pack, FIG. 4 is a perspective view of a cam gear and associated parts in the rotary magnetic sheet device, FIG. 5 is a perspective view of a left-hand and a right-hand-side plate in the rotary magnetic sheet device, FIG. 6 is a perspective view of a left-hand and a right-hand holder in the rotary magnetic sheet device, FIG. 7 is a perspective view of a left-hand and a right-hand control plate in the rotary magnetic sheet device, FIG. 8 is a perspective view of a center-core pressing arm, a regulator supporting arm and associated parts in the rotary magnetic sheet device, and FIG. 9 is a perspective view of a door member and associated parts at the pack insertion opening of the rotary magnetic sheet device.

FIG. 10 is a perspective view of another embodiment of the present invention.

FIG. 11 is a plan view of still another embodiment of the present invention.

FIG. 12 is plan view of yet another embodiment of the present invention.

FIG. 13 is a sectional view of part of the embodiment shown in FIG. 12.

FIG. 14 is a perspective view of a prior art head carriage guiding mechanism.

DESCRIPTION OF THE PREFERRED EMBODIMENTS

An embodiment of the present invention when applied to a magnetic head drive system of a rotary magnetic sheet device in an electronic still camera system will now be described.

Figure 2:
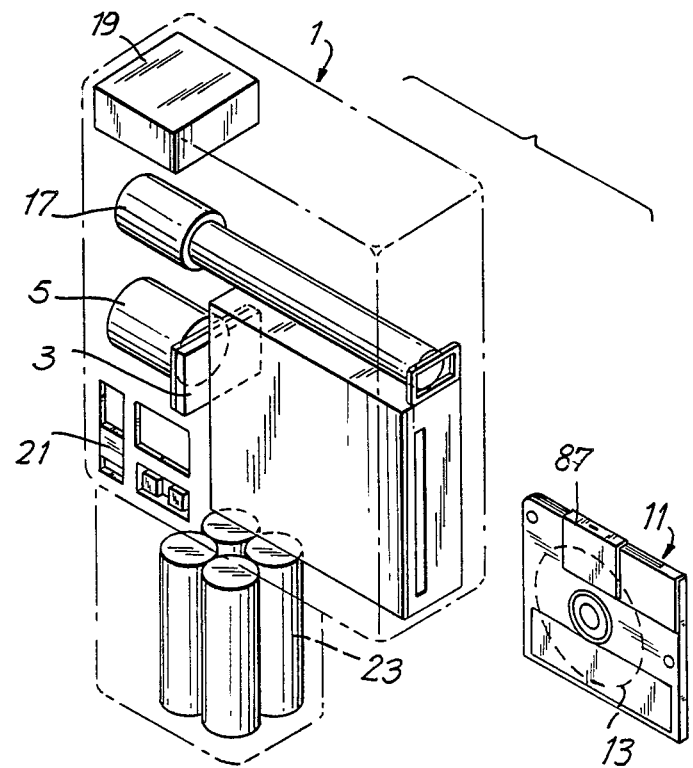

FIG. 2 is a schematic perspective view of an electronic camera, including the embodiment of the present invention, and a magnetic sheet pack. As shown in FIG. 2, the electronic camera generally designated by the reference numeral 1 includes an objective lens system 5 coupled to an imaging element 3, and picture information picked up by the imaging element 3 is recorded on a magnetic sheet 13 packed in a magnetic sheet pack 11 loaded in a rotary magnetic sheet device 7 from a pack insertion opening 9. The camera 1 further includes a view finder 15, a finder optical system 17, a flash 19, a manipulating button group 21 and a battery group 23.

Figure 3:
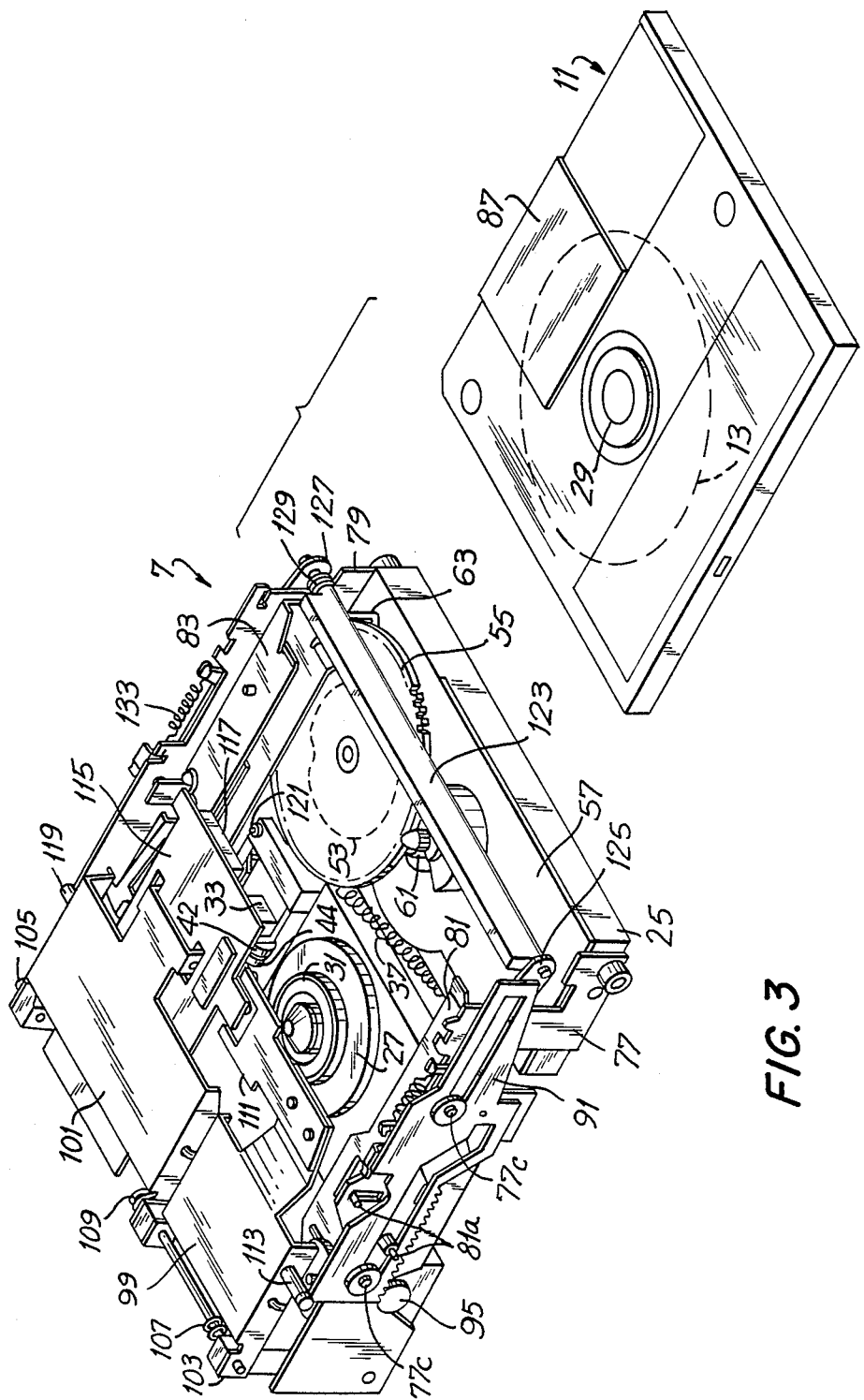
Figure 5:
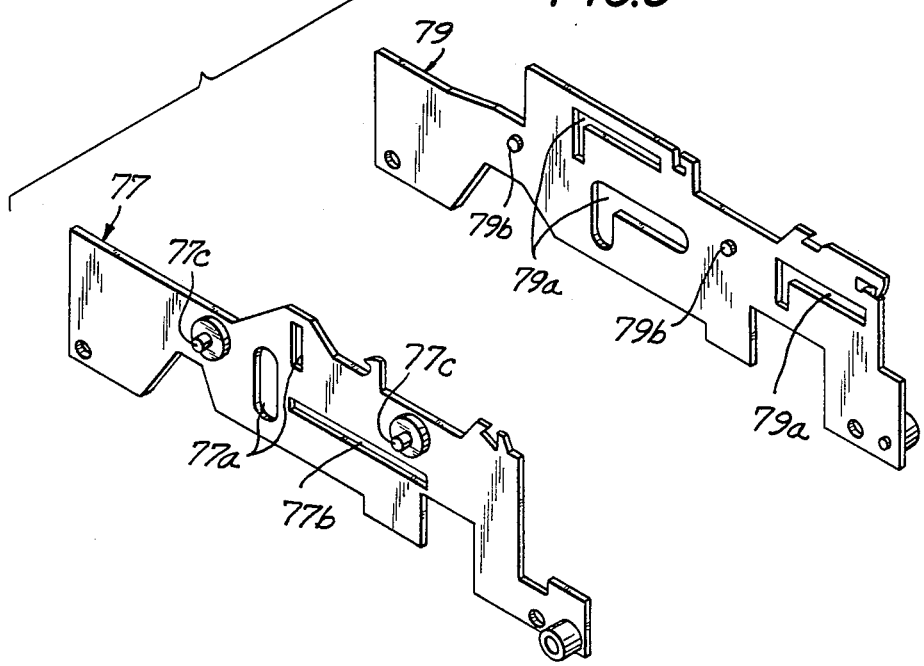

FIG. 3 is a perspective view of the rotary magnetic sheet device 7 shown together with the magnetic sheet pack 11, and FIG. 5 is an exploded perspective view of part of the rotary magnetic sheet device 7.

Figure 1:
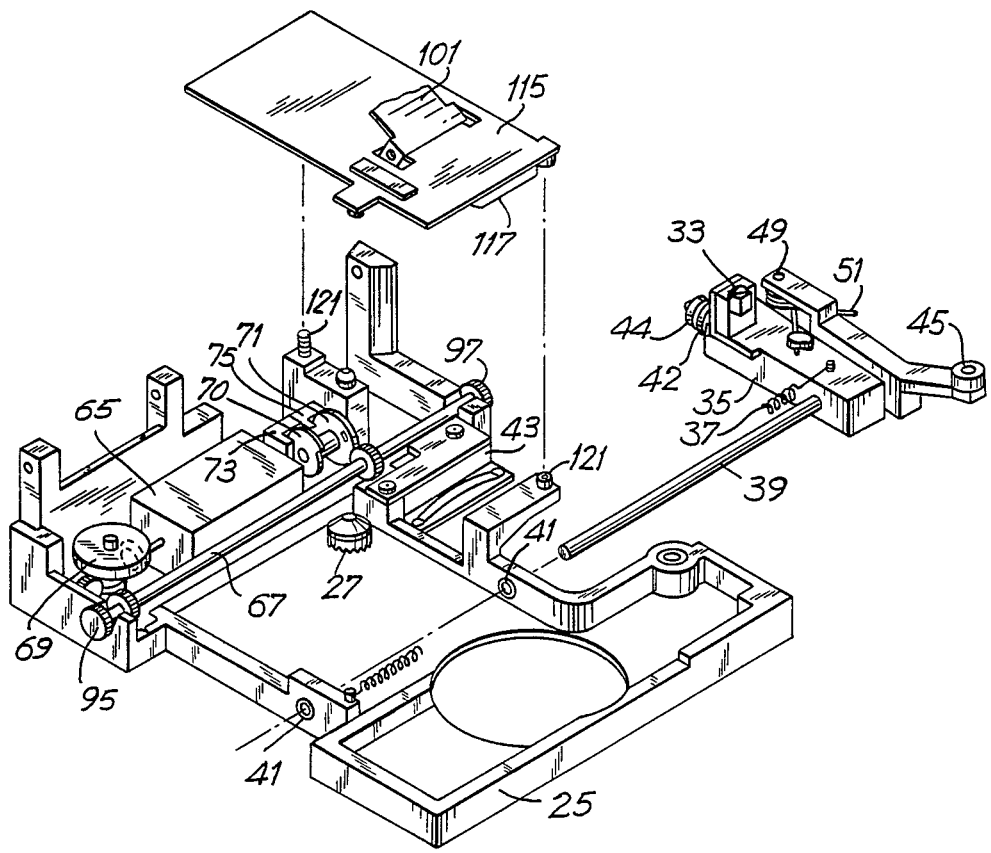

Referring to FIGS. 1 and 3, spindle motor 27 is fixedly disposed at about the center of a chassis 25 to drive the magnetic sheet 13. A chucking magnet 31 is mounted on the spindle of the spindle motor 27 to chuck a center core 29 of the magnetic sheet 13. The magnetic sheet 13 is fixed on the spindle of the spindle motor 27 when the center 29 of the magnetic sheet 13 is pressed onto the chucking magnet 31 by a center-core pressing member 111 (described later).

Figure 4:
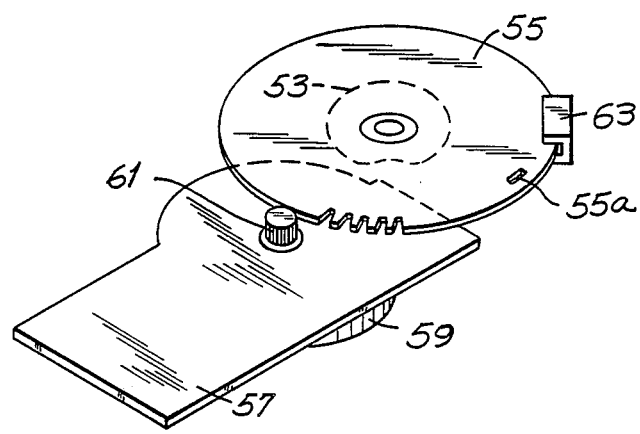

A carriage 35 carrying a magnetic head 33 is supported on the chassis 25 at a position adjacent to the spindle motor 27 so as to be slidable in the radial direction of the magnetic sheet 13 mounted on the spindle motor 27. The carriage 35 is normally biased by a tension spring 37 toward the center of the spindle motor 27. More precisely, a guide shaft 39 secured at one end thereof to one side of the carriage 35 is slidably journaled in oilless metal bearings 41 provided in the chassis 25, and a large guide roller 42 and a small guide roller 44 adapted to be received in a guide groove 43 formed in the chassis 25 are mounted on another side of the carriage 35 to constitute a head carriage guiding mechanism. An arm 47 having a cam follower 45 pivoted to one end thereof is rockably mounted at the other and thereof to the carriage 35 by a pivot pin 49. The arm 47 is normally biased by a torsion coil spring 51 so that the arm 47 normally engages the carriage 35 through a stopper (not shown) to be integrally combined with the carriage 35. The cam follower 45 is pressed by the force of the tension spring 37 onto a cam surface of a cam 53 pivoted to the chassis 25. A cam gear 55 is coaxially secured to the cam 53. As shown in FIG. 4 which is a perspective view of the cam gear 55 and associated parts, a pinion 61 is secured to the rotary shaft of a stepping motor 59 fixedly mounted on the chassis 25 through a mounting plate 57 and meshes the cam gear 55. Therefore, when the stepping motor 59 is rotated, the cam 53 is rotated at a reduced speed so that the carriage 35 is moved in the radial direction of the magnetic sheet 13 through the cam follower 45 following the profile of the cam surface of the cam 53.

In the rotary magnetic sheet device 7 employed in the embodiment of the present invention, a loading motor 65 is fixedly disposed on the chassis 25 at a position remote from the stepping motor 59 relative to the spindle motor 27, as shown in FIGS. 1 and 3. A control shaft 67 rotatably supported on the chassis 25 is rotated by the loading motor 65 through a reduction gear unit 69. A first and a second encoder 70 and 71 rotate in inter-locking relation with the rotation of the control shaft 67, and photo sensors 73 and 75 are associated with these encoders 70 and 71 respectively, so that the angular position of rotation of the control shaft 67 can be detected.

A left-hand and a right-hand side plate 77 and 79 are secured to a left and a right side wall of the chassis 25 respectively. FIG. 5 is a perspective view of these side plates 77 and 79. Referring to FIG. 5, the left-hand side plate 77 is formed with holder guide slots 77a for guiding a left-hand holder 81 (described below) in a vertical direction (the direction parallel to the axis of the spindle of the spindle motor 27) and a supporting slot 77b extending in a longitudinal direction (the direction of insertion and withdrawal of the magnetic sheet pack 11) for slidably supporting one end of a door open-close control pin 91e (described later). Further, guide pins 77c for supporting a left-hand control plate 91 (described later) are provided on the outer surface of the left-hand side plate 77. On the other hand, the right-hand side plate 79 is formed with L-shaped holder guide slots 79a for guiding a right-hand holder 83 (described below) in both a vertical direction and a longitudinal direction and is provided at its outer surface with guide pins 79b for supporting a right-hand control plate 93 (described later).

Figure 6:
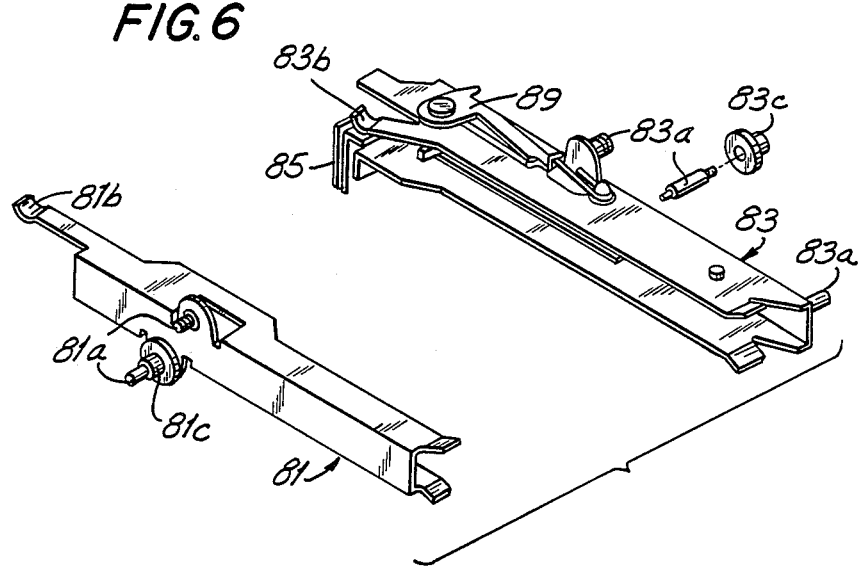

A left-hand and a right-hand holder 81 and 83 are mounted inside the left-hand and right-hand side plates 77 and 79 respectively. FIG. 6 is a perspective view of these holders 81 and 83. Referring to FIG. 6, the holders 81 and 83 are in the form of frames having a generally L-like cross-sectional shape so as to snugly receive the left and right side edges respectively of the magnetic sheet pack 11. Guide shafts 81a provided on the other surface of the left-hand holder 81 are slidably received in the holder guide slots 77a of the left-hand side plate 77. Thus, the left-hand holder 81 is vertically movably supported by the left-hand side plate 77. On the other hand, guide shafts 83a provided on the outer surface of the right-hand holder 83 are slidably received in the L-shaped guide slots 79a of the right-hand side plate 79, so that the right-hand holder 83 is vertically and longitudinally movably supported by the right-hand side plate 79. Further, these holders 81 and 83 are formed with pack retaining portions 81b and 83b respectively for resiliently abutting and holding the magnetic sheet pack 11 when the magnetic sheet pack 11 is inserted. Further, the right-hand holder is provided with a pack sensing switching 85 detecting the magnetic sheet pack 11 when the pack 11 is inserted, a window open-close mechanism (not shown) for opening and closing a window 87 of the magnetic sheet pack 11, and a pack ejecting mechanism 89.

Figure 7:
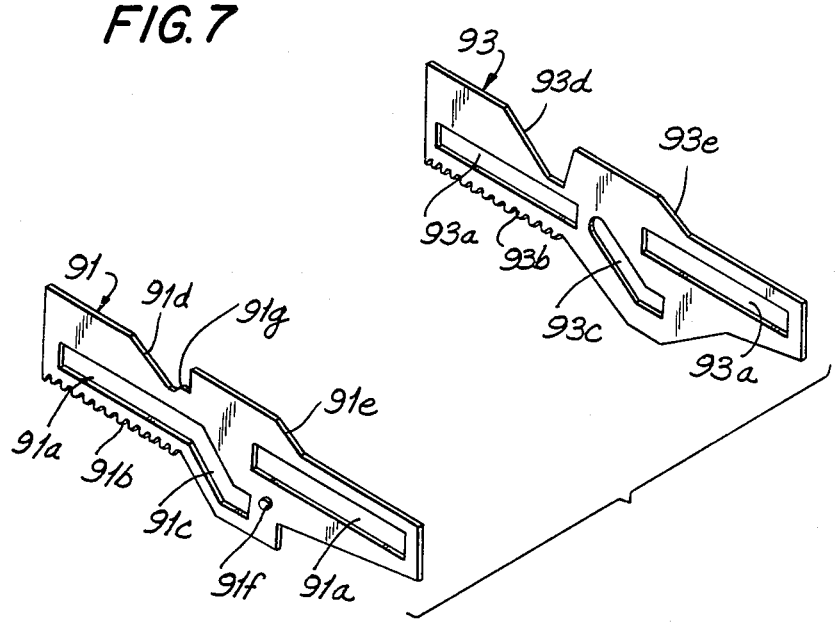

A left-hand and a right-hand control plate 91 and 93 are mounted outside the left-hand and right-hand side plates 77 and 79 respectively. FIG. 7 is a perspective view of these control plates 91 and 93. Referring to FIG. 7, the left-hand control plate 91 is formed with guide slots 91a into which the guide pins 77c of the left-hand side plate 77 are slidably received, so that the left-hand control plates 91 is longitudinally movably supported by the left-hand side plate 77. Also, the left-hand control plate 91 is formed with a rack 91b at a part of its lower end surface, and this rack 91b meshes a pinion 95 secured to the control shaft 67, so that the left-hand control plate 91 is driven in the longitudinal direction by the loading motor 65. Further, the left-hand control plate 91 is formed with a sloped guide slot 91c which is a continuous extension of one of the guide slots 91a. One of the guide shafts 81a provided on the outer surface of the left-hand holder 81 passes through one of the holder guide slots 77a of the left-hand side plate 77 and is received through a roller 81c into the guide slot 91a continuous with the sloped guide slot 91c in the left-hand control plate 91. Therefore, the longitudinal movement of the left-hand control plate 91 causes a vertical movement of the left-hand holder 81 along the holder guide slot 77a. Further, the left-hand control plate 91 is formed at its upper end surface with a sloped portion 91d for driving a center-core pressing arm 99 (described later) and another sloped portion 91e for driving an insertion door control arm (described later), and a control pin 91f for driving a door open-close gear arm (described later) is provided on the inner surface of the left-hand control plate 91.

On the other hand, the right-hand control plate 93 is similarly formed with longitudinally extending guide slots 93a into which the guide pins 79b of the right-hand side plate 79 are slidably received, so that the right-hand control plate 93 is longitudinally movably supported by the right-hand side plate 79. Further, the right-hand control plate 93 is formed with a rack 93b at a part of its lower end surface, and this rack 93b meshes a pinion 97 secured to the control shaft 67. Therefore, by the operation of the loading motor 65, the right-hand control plate 93 is driven in the longitudinal direction in synchronous relation with the left-hand control plate 91a. The right-hand control plate 93 is similarly formed with a sloped guide slot 93c into which one of the guide shafts 83a of the right-hand holder 83 is received through a roller 83c after passing through one of the holder guide slots 79a of the right-hand side plate 79. Therefore, the longitudinal movement of the right-hand control plate 93 causes a longitudinal and vertical movement of the right-hand holder 83 along the holder guide slots 79a. Further, the right-hand control plate 93 is formed at its upper end surface with a sloped portion 93d for driving a regulator supporting arm 101 (described below) and another sloped portion 93e for driving another insertion door control arm (described later).

Figure 8:
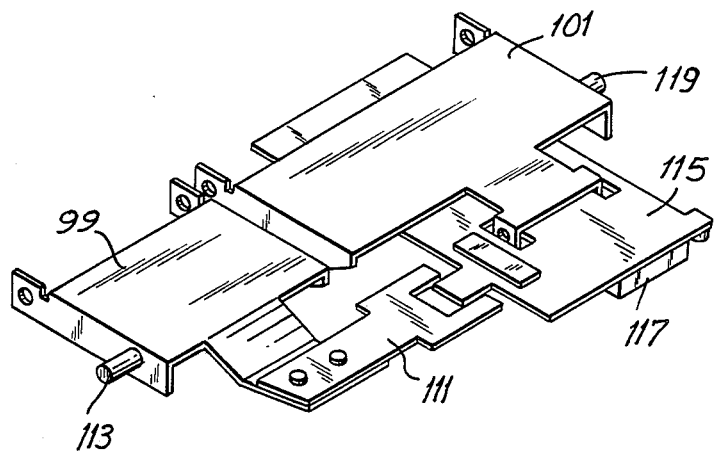

A center-core pressing arm 99 and a regulator supporting arm 101 are rockably supported on the chassis 25 by shafts 103 and 105 respectively at a level above the loading motor 65, and their free ends are normally biased toward the spindle motor 27 by torsion coil springs 107 and 109 respectively. FIG. 8 is a perspective view of these arms 99, 101 and associated parts. Referring to FIG. 8, a center-core pressing member 111 of a resilient material is secured to the free end of the center-core pressing arm 99, and the free end of the center-core pressing member 111 is located above the spindle of the spindle motor 27. Therefore, the center core 29 of the magnetic sheet 13 is pressed by the force of the spring 107 onto the chucking magnet 31 mounted on the spindle of the spindle motor 27. A pin 113 is provided on one side surface of the center-core pressing arm 99 to engage the sloped portion 91d of the left-hand control plate 91. When the left-hand control plate 91 is located in its forward position (as shown in FIG. 3), this pin 113 abuts the high-level portion of the upper end surface of the left-hand control plate 91, thereby urging the center-core pressing arm 99, hence, the center-core pressing member 111 away from the spindle motor 27 against the force of the spring 107. On the other hand, as the left-hand control plate 91 is shifted rearward, the pin 113 moves downward along the sloped portion 91d, and the free end of the center-core pressing member 111 is urged downward to perform the center-core pressing function. When the left-hand control plate 91 reaches its rearwardmost position, the pin 113 rides on a shoulder 91g of the sloped portion 91d, and, at such a position of the pin 113, the center-core pressing member 111 is slightly spaced apart from the center-core 29 of the magnetic sheet 13.

A regulator carrying plate 115 is supported by the free end of the regulator supporting arm 101, and a regulator 117 is secured to the lower surface of this regulator carrying plate 115. This regulator 117 is disposed opposite to the magnetic head 33 with the magnetic sheet 13 being interposed therebetween so as to regulate the position of the magnetic sheet 13 relative to the magnetic head 33. A pin 119 engageable with the sloped portion 93d of the right-hand control plate 93 protrudes from a side surface of the regulator supporting arm 101. When the right-hand control plate 93 is located in its forward position, this pin 119 abuts the high-level portion of the upper end surface of the right-hand control plate 93 thereby urging the regulator supporting arm 101, hence, the regulator 117 away from the spindle motor 27 against the force of the spring 109. On the other hand, as the right-hand control plate 93 is shifted rearward, the pin 119 moves downward along the sloped portion 93d, and the free end of the regulator carrying plate 115 is urged toward the spindle motor 27 until finally the free end of the regulator carrying plate 115 is engaged by a stopper 121 provided on the chassis 25, thereby positioning the regulator 117 at a predetermined position.

Figure 9:
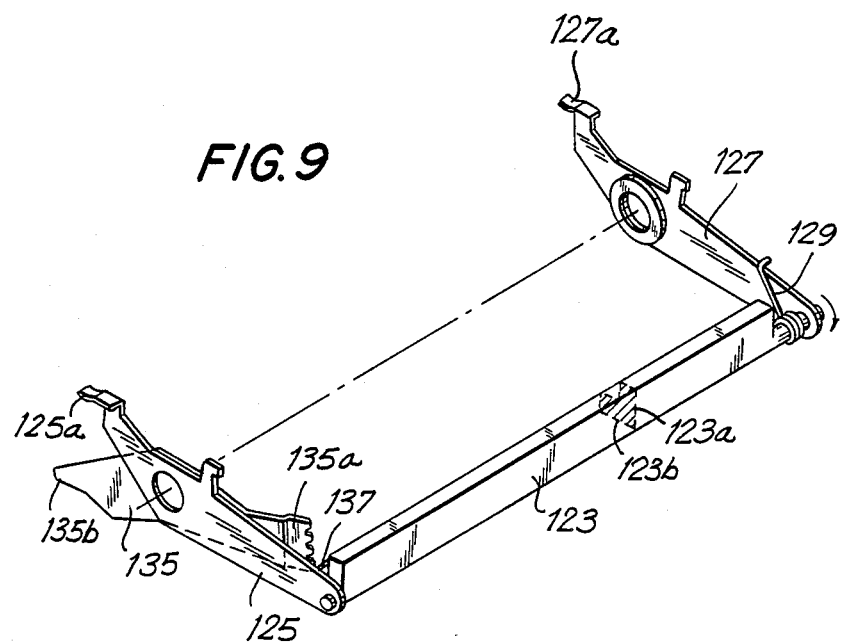

The pack insertion opening 9 of the rotary magnetic sheet device 7 is openably closed by a door member 123. FIG. 9 is a perspective view of the door member 123 and associated parts. Referring to FIG. 9, the door member 123 is composed of plates 123a and 123b orthogonal with respect to each other and has thus an L-like cross-sectional shape. The door member 123 is pivoted at its left-hand and right-hand ends to one end of a left-hand and a right-hand door control arm 125 and 127 respectively and is normally biased by a torsion coil spring 129 in a direction as shown by the arrow in FIG. 9 relative to the two control arms 125 and 127. The left-hand and right door control arms 125 and 27 are rockably supported by one of the guide pins 77c of the left-hand side plate 77 and one of the guide pins 79b of the right-hand side plate 79 respectively. The left-hand and right-hand door control arms 125 and 127 are bent at the other end to form projections 125a and 127a which engage the sloped portions 91e and 93e of the left-hand and right-hand control plates 91 and 93 respectively. Tension coil springs 131 and 133 are spun between the door control arms 125, 127 and the left-hand and right-hand side plates 77, 79 so as to press the projections 125a and 127a onto the sloped portions 91e and 93e of the left-hand and right-hand control plates 91 and 93 respectively. Further, a door open-close gear arm 135 is rockably supported by the other guide pin 77c of the left-hand side plate 77. A sector gear 135a is formed at the door-side end of the door open-close gear arm 135 and meshes a sector gear 137 provided on the door member 123 in concentric relation with the center of rocking movement of the door member 123. The door open-close gear arm 135 is further formed with a stepped portion 135b which is engaged by the control pin 91f of the left-hand control plate 91. Therefore, when the left-hand and right-hand control plates 91 and 93 are located in their forward position, the pack insertion opening 9 is closed by the plate 123a of the door member 123. However, when the left-hand and right-hand control plates 91 and 93 are shifted rearward, the projections 125a and 127a of the door control gear arms 125 and 127 move downward along the sloped portions 91e and 93e of the left-hand and right-hand control plates 91 and 93 respectively, and, as a result, the door control arms 125 and 127 rotate to shift upward the pivot points of the door member 123. The door member 123 rotates 90° to close the peak insertion opening 9 with its plate 123b, and, in such a state, the door member 123 is locked by engagement of the control pin 91f of the left-hand control plate 91 with the stepped portion 135b of the door open-close gear arm 135.

In loading a magnetic sheet pack 11 in the electronic still camera having a structure as described above, the door member 123 closing the pack insertion opening 9 is forced open by the magnetic sheet pack 11 to insert the magnetic sheet pack 11 into the rotary magnetic sheet device 7 through the pack insertion opening 9. When the magnetic sheet pack 11 is advanced to the pack retaining portion 83b of the right-hand holder 83, the pack sensing switch 85 is actuated to energize the loading motor 65 thereby urging the left-hand and right-hand control plates 91 and 93 rearward. By the rearward movement of the left-hand and right-hand control plates 91 and 93, the magnetic sheet pack 11 is pulled inward together with the right-hand holder 83. Subsequently, the magnetic sheet pack 11 is moved downward toward the spindle motor 27 together with the left-hand and right-hand holders 81 and 83, and the center core 29 of a magnetic sheet 13 in the magnetic sheet pack 11 is fitted on the spindle motor 27. Then, the center-core pressing arm 99 is actuated by the movement of the left-hand and right-hand control plates 91 and 93 to press the center core 29 of the magnetic sheet 13 onto the chucking magnet 31 on the spindle of the spindle motor 27 by the center-core pressing member 111. Also, the regulator 117 is positioned at the predetermined location by the function of the regulator supporting arm 101, and the pack insertion opening 9 is closed by the door member 123 to complete the loading operation.

In the recording or playback mode, the stepping motor 59 is energized to rotate the cam 53 at the reduced speed. The arm 47 and the head carriage 35 are moved together with the shaft 39, and the magnetic head 33 carried by the head carriage 35 is fed in the radial direction of the magnetic sheet 13 to be positioned at the desired position. The carriage 35 has a smaller width in its moving direction and smaller in size and lighter in weight than the prior art one shown in FIG. 14. Therefore, the burden of the drive system for the carriage 35 is correspondingly reduced.

When the magnetic head 33 in use has been excessively worn, and its replacement is required, the magnetic head 33 is removed together with the carriage 35 in most cases. In such a case, all that required in the present invention is to slide the guide shaft 39 for withdrawing the guide shaft 39 from the chassis 25 together with the carriage 35, unlike the prior art case where the screws or the like fixing the guide shafts must be loosened for the withdrawal of the magnetic head and, after mounting a new magnetic head, the screws must be carefully tightened again. It is an additional advantage of the present invention that, when the guide shaft 39 is accurately secured to the head carriage 35, adjustment at the time of replacement is unnecessary, and the positioning accuracy is high.

The aforementioned embodiment of the head carriage guiding mechanism according to the present invention includes the large guide roller 42, small guide roller 44 and guide groove 43 besides the single guide shaft 39. However, the present invention is in no way limited to such an embodiment. FIGS. 10 and 11 show other embodiments respectively of the present invention in which two guide shafts 137 and 139 are provided. As shown in FIGS. 10 and 11, one of the guide shafts or the guide shaft 139 is secured to a chassis 141 as in the case of the prior art guide mechanism. On the other hand, the other guide shaft 137 is secured to a head carriage 143 and journaled in oilless metal bearing 143 to slidably extend through the chassis 141. Thus, these embodiments exhibit effects similar to that of the first embodiment. In FIGS. 10 and 11, the reference numerals 147, 149, 151, 153 and 155 designates a magnetic head, an E-ring, shock alleviating washers of rubber or like material, and a compression spring, respectively. When replacement of the carriage 143 is required, the E-ring 151 is removed from the guide shaft 137, and the guide shaft 137 is then withdrawn from the chassis 141.

In the first embodiment of the head carriage guiding mechanism, the cam 53 is utilized to drive the head carriage 35. However, the present invention is not limited to the guiding mechanism utilizing the cam. In another embodiment, a feed screw shaft 157 as, for example, shown in FIGS. 12 and 13 is employed for the guiding purpose. Referring to FIGS. 12 and 13, the feed screw shaft 157 extends through a chassis 161 in parallel to a guide shaft 159 and makes threaded engagement with the chassis 161. The feed screw shaft 157 is coupled at one end thereof to one end of a carriage 165 through a ball bearing 163 and at the other end thereof to a stepping motor 171 through gears 167 and 169. Therefore, when the stepping motor 171 is driven to rotate the feed screw shaft 157 at a speed reduced by the gears 167 and 169, the carriage 165 is moved along the guide shaft 159. A shaft 179 protrudes from the other end of the carriage 165, and a large guide roller 173 and a small guide roller 175 are rotatably mounted on the shaft 179 and are received in a guide groove 177 provided on the chassis 161 along the moving direction of the carriage 165 to prevent the carriage 165 from rotation. A guide plate 181 with which the large guide roller 173 makes rolling engagement is provided on the upper surface of the chassis 161, and a thin leaf spring 183 acting to lift the small guide roller 175 is provided together with a stopper plate 185 on the lower surface of the chassis 161. These members 181, 183 and 185 constitute the guide groove 177. Therefore, when the carriage 165 is guided along the guide shaft 179, the large guide roller 173 and the small guide roller 175 making rolling engagement with the guide plate 181 and thin leaf spring 183 respectively rotate in opposite directions. In FIGS. 12 and 13, the reference numerals 187 and 189 designate a magnetic head and an escapement preventive member respectively.

It will be understood from the foregoing detailed description of preferred embodiments of the head carriage guiding mechanism of the present invention that the guide shaft is secured integrally to the head carriage. This arrangement facilitates replacement of the head carriage, improves the head positioning accuracy and reduces the size and weight of the guiding mechanism.

We claim:

1. In a magnetic recording/reproducing apparatus, of the type including:
   a rigid chassis;
   a drive motor rigidly mounted on said chassis, said drive motor being operative to support and rotate a magnetic recording disc;
   a guide shaft supported by said chassis for sliding movement axially of the longitudinal axis of said guide shaft and positioned spaced laterally of said drive motor and parallel to a radius of a said magnetic recording disc supported by said motor;
   a carriage rigidly supported said guide shaft and extending laterally of said guide shaft;
   a recording/reproducing head mounted on said carriage and moveable by said carriage along said radius of said magnetic recording disc; and
   means for controllably moving said carriage to move said recording/reproducing head along a radius of a said magnetic recording disc supported by said motor, the improvement comprising:
   a bearing shaft extending from said carriage at a position spaced from said guide shaft and arranged with its longitudinal axis at a right angle to the longitudinal axis of said guide shaft, a first roller freely rotatable on said bearing shaft, a second roller freely rotatable on said bearing shaft and freely rotatable relative to said first roller, guide means rigidly supported by said chassis and providing a surface over which one of said rollers is freely rollable, and spring means carried by said chassis and providing a surface over which the other of said rollers is freely rollable, said spring means reacting on said other roller and biasing said one roller into engagement with said guide means to accurately position said carriage and said recording/reproducing head relative to said magnetic recording disc.

* * * * *